(12) United States Patent
Uemura et al.

(10) Patent No.: US 7,037,087 B2
(45) Date of Patent: May 2, 2006

(54) CAPACITY CONTROL VALVE AND CONTROL METHOD THEREFOR

(75) Inventors: Norio Uemura, Tokyo (JP); Yoshihiro Ogawa, Tokyo (JP)

(73) Assignee: Eagle Industry Co., Ltd, Tokyo (JP)

( * ) Notice: Subject to any disclaimer, the term of this patent is extended or adjusted under 35 U.S.C. 154(b) by 174 days.

(21) Appl. No.: 10/669,353

(22) Filed: Sep. 25, 2003

(65) Prior Publication Data

US 2004/0060604 A1    Apr. 1, 2004

(30) Foreign Application Priority Data

Sep. 26, 2002   (JP) .............................. 2002-281419

(51) Int. Cl.
*F04B 49/00* (2006.01)
*F04B 27/08* (2006.01)

(52) U.S. Cl. .............................. 417/222.2; 137/625.18; 137/625.2

(58) Field of Classification Search ............. 137/625.2, 137/625.18; 417/222.2
See application file for complete search history.

(56) References Cited

U.S. PATENT DOCUMENTS

| | | | | | |
|---|---|---|---|---|---|
| 4,606,705 | A | * | 8/1986 | Parekh ..................... | 417/222.2 |
| 5,071,321 | A | * | 12/1991 | Skinner et al. .......... | 417/222.2 |
| 5,702,235 | A | * | 12/1997 | Hirota et al. ............ | 417/222.2 |
| 5,836,748 | A | * | 11/1998 | Kawaguchi et al. ..... | 417/222.2 |
| 5,964,578 | A | * | 10/1999 | Suitou et al. ............ | 417/222.2 |
| 6,102,668 | A | * | 8/2000 | Kawaguchi et al. ..... | 417/222.2 |

* cited by examiner

*Primary Examiner*—Stephen M. Hepperle
(74) *Attorney, Agent, or Firm*—Arent Fox PLLC (57) ABSTRACT

An object of the capacity control valve is to provide a constant, stable control of the pressure load without fluctuations. Also another object is to improve an energy efficiency of the drive torque of the rotary shaft by means of a control of the pressure load. In this arrangement, the solenoid coil section controls as a reference value of pressure load which is calculated by taking a sum of a pressure differential between the discharge pressure and the pressure in the control chamber, multiplied by the area of the open passage of the first valve seat, and a pressure differential between the pressure in the control chamber and the suction pressure, multiplied by the area of the open passage of the second valve seat.

3 Claims, 8 Drawing Sheets

CAPACITY CONTROL VALVE AND CONTROL METHOD THEREFOR

BACKGROUND OF THE INVENTION

1. Field of the Invention

The present invention relates generally to a capacity control valve for variably modulating a capacity or a pressure of a process fluid in a control chamber of an air-conditioning system and its control method. More particularly, the invention relates to a capacity control valve and its control method in which a capacity or a pressure in a control chamber of a compressor is controlled with reference to the pressure load of the capacity control valve.

2. Description of the Related Art

There have been known as a relative art of the present invention capacity control valves for a variable displacement type swash plate compressor in an air-conditioning system. The relative art of the capacity control valve is illustrated in FIG. 8.

Figure 8:
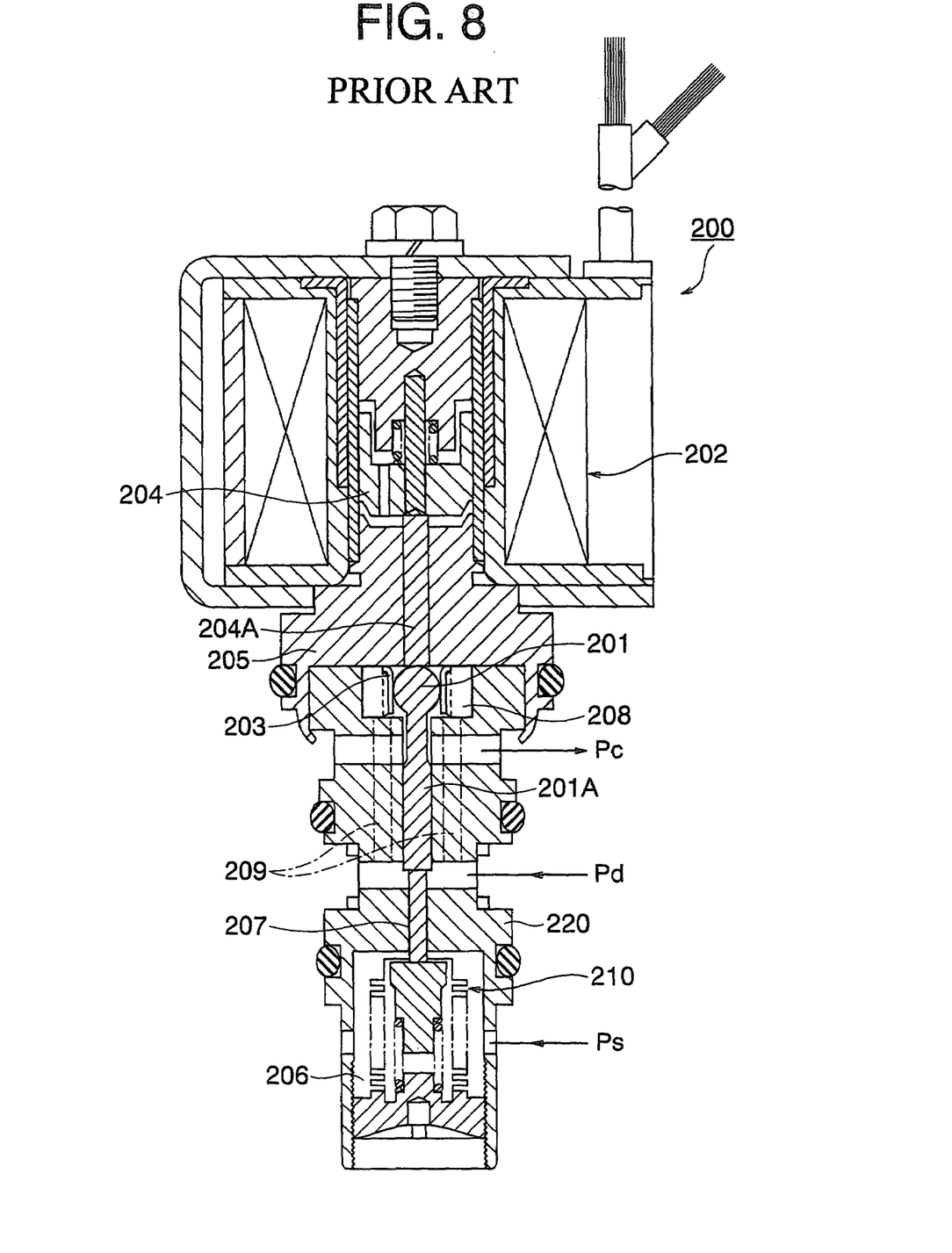
FIG. 8 is a cross sectional view of a control valve for a variable displacement compressor as a relative art relative to the present invention.

In FIG. 8, a pressure sensing element 210 is disposed in a suction chamber 206 which is located at a lower end of a capacity control valve 200. The pressure sensing element 210 is composed of a resilient bellows with a biasing spring 210A which is disposed inside the bellows and the element is constructed in such a way that an upper end of the element moves downward as a result of a contraction due to a suction pressure Ps supplied from an external. An intermediate rod 207 which is connected with an upper end of the pressure sensing element 210 is disposed in a guide hole of a housing 220 in an axially movable manner. Furthermore, a valve body 201 integrally connected to the intermediate rod 207 is disposed in a valve chamber 208, as shown in FIG. 8, at an upper portion of the housing 220. The valve body 201 moves upward or downward, which accordingly opens or closes the valve chamber 208 by lifting from or seating against a valve seat of a valve hole in the valve chamber 208.

The housing 220 has an intake port for a suction pressure Ps, an outlet port for a discharge pressure Pd, and an intake port of a crank chamber for a crack pressure Pc wherein the outlet port for the discharge pressure Pd is connected to the valve chamber 208 by means of a through communicating passage 209 as indicated by the dotted line. When the valve chamber 208 is opened by the valve body 201, the valve chamber 208 is directly connected to the intake port of the crank chamber for the crank pressure Pc via a valve hole and a fluid at the crank pressure Pc fluid flows into the crank chamber, which is not shown in FIG. 8.

In an opening or a closing of the valve body 201, the suction pressure of the pressure sensing element 210 is altered in accordance with the generated force of an electromagnetic solenoid coil section 202 which is disposed at an upper end portion of the capacity control valve 200, and a capacity control of the variable displacement compressor is achieved by adjusting the crank pressure Pc of the crank chamber by means of controlling an incoming flow of the discharge pressure Pd into the crank chamber in accordance with the degree of opening of the valve body 201 against a valve seat for a valve hole.

The pressure sensing element 210 disposed in the suction chamber 206 has a load characteristic such that the element expands or contracts in accordance with the suction pressure Ps within a normal use range of the suction pressure Ps.

When no electric current is supplied to the electromagnetic solenoid coil section 202, the valve body 201 is maintained at a fully opened position by an urging spring force of a return spring 203. This fully opened position corresponds to a fully unloaded operation state. When the current is supplied to the solenoid coil section 202, an electromagnetic attractive force is generated between a plunger 204 and a fixed iron core 205. The valve body 201 maintains its fully opened position, namely an insensitive range, until the electromagnetic force exceeds the opposing urging force of the return spring 203.

However, when an electromagnetic force exceeds the urging force of the return spring 203, a plunger rod 204A to push the valve body 201 in a direction of closing the valve, entering a control range of the suction pressure Ps. Within the control range, as a coil current becomes larger, a larger force to close the valve as well as a lower set value of the suction pressure Ps is resulted.

In this type of capacity control valve 200, it is difficult to quickly reduce a heavy cooling load because the valve relies on the suction pressure Ps. Consequently, the compressor has to be shut off by means of clutch and the air-conditioning system needs to be turned off. The on-off action of the clutch induces an abrupt torque change of the compressor, which requires more fuel consumption due to an increased engine power. This also affects a driving performance.

Furthermore, a variation in the crank pressure Pc due to the different operation modes of a compressor may cause inevitable disturbances to the suction pressure Pc. Therefore, an accurate current control of the electromagnetic solenoid coil is hard to achieve and precision of a capacity control is hardly improved by means of a specified suction pressure Ps.

For a capacity control valve 200 which adopts the suction pressure Ps as a control reference, when a set value of the suction pressure needs to be changed by means of the solenoid coil 202, a high susceptibility of the suction pressure to a thermal load of an evaporator worsens a response of the compressor in accordance with a change in the discharge amount. Under this circumstance, if the compressor rapidly increases its rotational speed, a change in the discharge cannot keep up with such a sudden change, which results in a temporary increase of a pressure load onto the compressor, which may in turn cause an inaccurate action of the capacity control valve and loss of energy.

As a capacity control valve based on suction pressure Ps has a difficulty in rapidly modulating a control chamber pressure, incorporation of a clutch is required for a variable displacement compressor, for instance, which causes noise during its operations. Furthermore, a torque increase due to the ON-OFF action of the clutch is likely to impose further difficulty on an accurate capacity control.

The present invention is introduced to resolve the above mentioned problems. A primary technical goal which this invention tries to achieve is to realize an accurate control of the pressure or the capacity of a capacity control valve by means of a solenoid coil section via a highly responsive fluid pressure without being affected by an engine speed or peripheral temperature characteristics.

Another goal is to achieve a stable control of a capacity control valve according to a specified pressure load with no fluctuation of the pressure load and to prevent loss of rotary torques.

SUMMARY OF THE INVENTION

The present invention is made to solve the above technical problems. The primary object of the present invention is to provide a capacity control valve for a pneumatic machine with which a highly responsive and accurate control cane be achieved via an operational fluid pressure regardless of the engine speed or surrounding temperatures. Another object is to minimize an energy consumption of the pneumatic machine. A solution to these problems is embodied as follows.

A preferred embodiment of a capacity control valve constructed in accordance with the principles of a first invention is a capacity control valve in which the degree of opening of the valve is modulated by a solenoid coil section and a control pressure fluid flowing through an open passage of the valve is used to control the capacity or the pressure in the control chamber. A capacity control valve, according to the present invention, comprises a first valve chamber (3) disposed in the valve section and communicating with a first communicating passage (7) for the discharge pressure Pd, a first valve seat (10) located in the passage between the first valve chamber (3) and the first communicating passage(7), a third communicating passage (9A) for a first control chamber pressure (Pc1) communicating with the control chamber as well as the first valve chamber (3), a second valve chamber (4) communicating with a fourth communicating passage (9B) for a second control chamber pressure (Pc2) which communicates with the control chamber, a second communicating passage (8) for a suction pressure Ps communicating with a chamber of the suction pressure as well as the second valve chamber (4), a second valve seat (11) located in the passage between the second valve chamber (4) and the second communicating passage(8), a first valve body (20) disposed within the first valve chamber (3) and having a second valve face (20A) which opens or closes against the first valve seat (10), a second valve body (21) disposed within the second valve chamber (4) and having a second valve face (21A) which opens or closes against the first valve seat (11), a connection rod (25B) seating one of the first valve body (20) and the second valve body (21) against the corresponding valve seat while lifting the other valve body away from the corresponding valve seat, and a solenoid coil section S driving the first valve body (20) and the second valve body (21) in an opening or a closing direction via a solenoid rod (25, 25A). Furthermore, the solenoid coil section S controls a pressure load according to a specified input given to a controller in which the input is defined as a sum of a pressure differential (Pd−Pc1) between the discharge pressure (Pd) and the first control chamber pressure (Pc1), multiplied by a pressure receiving area (S1) of the first valve body (20) receiving the pressure differential between the discharge pressure (Pd) and the first control chamber pressure (Pc1), and a pressure differential (Pc2−Ps) between the second control chamber pressure (Pc2) and the suction pressure (Ps), multiplied by a pressure receiving area (S2) of the second valve body (21) receiving the pressure differential between the second control chamber pressure (Pc2) and the suction pressure (Ps).

In a capacity control valve related to the first invention, a pressure load is determined by the following formula; $F1=S1\times(Pd-Pc)+S2\times(Pc-Ps)$. In this formula, F1 represents a pressure load which is a driving force provided by the solenoid coil section S for an opening or a closing of the valve (the force being an urging force Fk1 exerted by a first spring means 48 disposed in the solenoid coil section S), Pd a discharge pressure, Ps a suction pressure, Pc a pressure in the control chamber wherein Pc=Pc1=Pc2, and S1 approximately a pressure receiving area of the first valve body subject to a discharge pressure, and S2 approximately a pressure receiving area of the second valve body subject to the discharge pressure.

According to the formula $F1=S1\times(Pd-Pc)+S2\times(Pc-Ps)$ which represents a driving force of the solenoid coil section S, the pressure in a control chamber is controlled by the actions of the first valve body 20 and the second valve body 21 wherein the two valves open or close in opposite directions with each other.

This allows the discharge pressure Pd, unlike the prior art using the suction pressure Ps, to be used to modulate the pressure in the control chamber of the capacity control valve 1. That is, an opening of the valve body 21 allows a fluid of discharge pressure Pd to flow into the control chamber. The fluid of discharge pressure Pd brought in then is able to control the pressure in the control chamber by means of the mutually opposing valve opening and closing of the first valve body 20 and the second valve body 21, and such a modulation of the pressure in the control chamber allows a quick change of the inclination angle of a swash plate.

In other words, a pressure change in the control chamber in accordance with a total compression capacity change by the swash plate of a variable displacement compressor (hereafter abbreviated as a compressor) can be realized in a short period of time. On the other hand, with a conventional control based on a suction pressure as seen in the prior art, such a short period of time cannot be achieved because of a negative influence imposed by a suction temperature and a compressor speed.

When the compressor speed is quickly rising, a pressure load is controlled at a specified level by the solenoid coil section S in accordance with a pressure load variation caused by an operational condition. Therefore, a control based on an appropriate pressure load can be attained.

Furthermore, deenergizing the solenoid coil section S leads to an opening of the first valve body 20 as well as a closing of the second valve body 21, which results in a rapid increase of the pressure in the control chamber. This assures the capacity of a compressor to be kept minimal and allows the compressor to continuously operate with a small driving power loss of engine. Also an absence of clutch can avoid a clutch noise and contributes an effect of decreasing a fluctuation of a rotary torque.

In addition, when both the first valve body 20 and the second valve body 21 are in their opening positions, the discharge pressure Pd, the control chamber pressure Pc, and the suction pressure Ps are so controlled by adjusting the degree of opening of the first valve body 20 and the second valve body 21 that a desired pressure load is obtained based on the pressure load F1 given by the solenoid coil section S.

Preferred control method of a capacity control valve related to a second invention is a capacity control method for modulating a capacity or a pressure of the control chamber by making a fluid of the discharge pressure within the chamber of the discharge pressure to flow into the control chamber while making a fluid of the control pressure within the control chamber to flow out to the chamber of the suction pressure. Action of the valve body in the capacity control valve is modulated by controlling a pressure load according to a specified value supplied to a controller wherein the pressure load represents a sum of a pressure differential (Pd−Pc1) between a discharge pressure (Pd) and a first pressure in a control chamber (Pc1) multiplied by a pressure receiving area (S1) at which the first valve body is acted on in its valve opening direction and a pressure differential (Pc2−Ps) between a second pressure in a control chamber pressure (Pc2) and a suction pressure (Ps) multiplied by a pressure receiving area (S2) at which the second valve body is acted on in its valve opening direction.

The control method of a capacity control valve related to the second invention is to modulate the driving force of a solenoid coil section S so as to satisfy $F1=S1\times(Pd-Pc)+S2\times(Pc-Ps)$. Also since the valve is so constructed that the opening direction of the first valve body 20 coincides with the closing direction of the second valve body 21, a pressure within the control chamber can be modulated solely by a pressure change of the discharge pressure Pd without a disturbance of suction pressure Ps. Action of the first valve body 20 allows a fluid of the discharge pressure (Pd) to flow into the control chamber and the simultaneous actions of opening of the first valve body 20 and closing of the second valve body 21 contribute the pressure control within the control chamber, which in turn leads to a quick shift of the inclination angle of a swash plate triggered by a pressure change within the control chamber. That is, a change of a discharge pressure change in accordance with a total compression capacity change by the swash plate of a compressor can be realized in a short period of time.

In addition, deenergizing the solenoid coil section S suspends the capacity control valve 1, hence stoppage of control of the compressor, and consequently the first valve body 20 opens and the second valve body 21 closes, which increases the pressure within the control chamber. This assures the capacity of the compressor to be kept minimal and allows the compressor to continuously operate with a small driving power loss of engine. A torque fluctuation is also prevented.

In addition, when both the first valve body 20 and the second valve body 21 are in their opening positions, the discharge pressure Pd, the control chamber pressure Pc, and the suction pressure Ps are so controlled by adjusting the openings of the first valve body 20 and the second valve body 21 that a desired pressure load is obtained according to a pressure load F1 observed at the solenoid coil section S.

DETAILED DESCRIPTION OF THE INVENTION

Described below is details of the figures of preferred embodiments of a capacity control valve constructed in accordance with the principles of the present invention. All the figures explained below are constructed according to actual design drawings with accurate dimensional relations.

Figure 1:
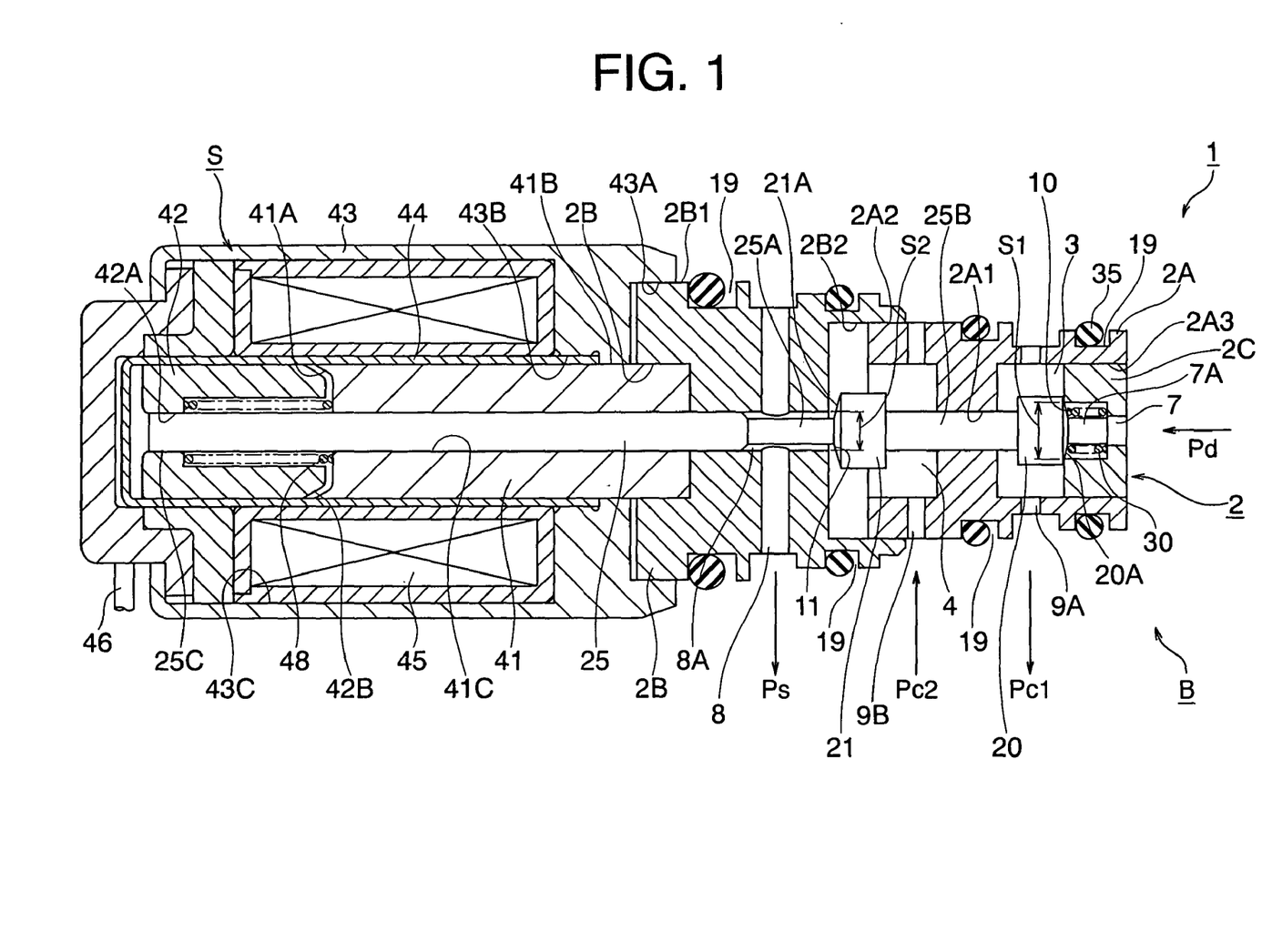
FIG. 1 is a cross sectional view of a capacity control valve as a first embodiment relative to the present invention.

FIG. 1 is a cross sectional view of a capacity control valve as a first embodiment relative to the present invention In FIG. 1, 1 signifies a capacity control valve. A valve housing 2 forms an outer shape of the capacity control valve 1. This valve housing 2 retains a through hole in it, and an unifying surface 2A2 of a first valve housing 2A and a mating surface 2B2 of a second valve housing 2B are joined together to form an integral structure. The first valve housing 2A and the second valve housing 2B are made of metals such as steel, aluminum, stainless or plastic materials.

In the first valve housing 2A, a separation adjusting portion 2C is connected at the one end of the through hole. The second valve housing 2B is also connected with the solenoid coil section S. And the first valve housing 2A and the second valve housing 2B have assemblable structures in order to dispose a first valve body 20 and a second valve body inside the housings. Shapes and forms shown in FIG. 1 may be modified as long as the first valve body 20 and the second valve body 21 are driven by different solenoid coil sections S, S.

Also the separation adjusting portion 2C sealingly fits the first valve housing 2A so as to block a first valve chamber 3, and use of seal-tight screw thread allows an accurate positioning of the first valve body 20 in its opening action and the second valve body 21 in it closing action relative to respective valve seats 10, 11.

A portion of the through hole axially disposed inside the valve housing 2 constitutes the first valve chamber 3 at one end. Furthermore, another portion of the through hole constitutes a second valve chamber 4 which communicates with the first valve chamber 3. The first valve chamber 3 disposes a first communicating passage 7 in it which can be connected with a fluid passage for a fluid of discharge pressure Pd of a variable displacement compressor (hereafter abbreviated as a compressor). Disposed between the first communicating passage 7 and the first valve chamber 3 is a valve seat chamber 7A whose diameter is larger than that of the first communicating passage 7. At the opening area of the valve seat chamber 7A near the first valve chamber 3, a first valve seat 10 is disposed which forms a plane surface. The profile of the first valve seat 10 may form a tapered surface toward the first valve chamber 3.

The first valve chamber 3 of the valve housing 2 further retains a plurality of third communicating passages 9A which communicate with a crank chamber which is not shown in the figure. This third communicating passage 9A serves as a passage to supply a refrigerant gas which flows in from the first communicating passage 7 to a crank chamber (control chamber in general term) of the variable displacement compressor as a control chamber pressure Pc1.

Further disposed along the through hole of the valve housing 2 is a second valve chamber 4 in a large diameter. This second valve chamber 4 is directly connected with the third valve chamber 3 by a guide hole 2A1. The second valve chamber 4 retains a plurality of fourth communicating passages 9B which radially extend in an equally spaced manner along the circumference, through which the fluid at crank chamber pressure Pc2 of the crank chamber flows into the second valve chamber 4. The control fluid adjusts the crank chamber pressure by flowing into the second valve chamber 4.

A valve seat hole 8A is further disposed in the through hole in the outlet side of the second valve chamber 4. A second valve seat 11 is disposed at the opening of the valve seat hole 8A towards the second valve chamber 4. The profile of the second valve seat 11 which is shown as a sharp corner may form a tapered surface toward the second valve chamber 4.

The valve seat hole 8A is communicated to a second communicating passage 8. This second communicating passage 8 is so constructed that it communicates with another passage directly connected to the crank chamber of the variable displacement compressor which is not shown in the figure and the fluid of suction pressure Ps is made flown out through it.

It is noted that the first communicating passages 7, the second communicating passages 8, the third communicating passages 9A, and the fourth communicating passages 9B are radially extended toward the outer diameter surface of the valve housing 2. For instance, these communicating passages may be disposed in two or four equally spaced positions, forming a radially extending through holes.

Four O-ring glands 19 are disposed in parallel on the outer diameter surface of the valve housing 2. Rubber-made or resin-made O-rings are installed in the O-ring glands 19 so as to securely seal mating surfaces after the capacity control valve 1 is assembled to the fitting bore of the variable displacement compressor.

Also the end portion of the valve housing 2 retains a joining face 2B1 which mates with a fitting surface 43A of the solenoid coil section S, by which the valve portion B and the solenoid valve portion S are integrated.

Disposed inside the through hole of the valve housing 2 is an action rod 25 being connected with the first valve body 20 and the second valve body 21. And the valve seat chamber 7A retains a third spring 30 (spring urging force as Fk3) in it. This third spring 30 exerts a resilient force to the first valve body 20 towards the solenoid coil section S.

This first valve body 20 has a cylindrical form and is disposed inside the first valve chamber 3. Also the first valve body 20 retains a first valve body face 20A on its end surface. This first valve body face 20A is tapered relative to the first valve seat 10. Surface area of a circle formed by the contact of the first valve body face 20A and the first valve seat 10 represents a first pressure receiving area which is denoted by S1. And opening the first valve body 20 allows the fluid (refrigerant) of discharge pressure Pd to flow in through the first communicating passage 7. Action of the first valve body 20 is determined by the sum of the driving force of a plunger 42 due to an electric current supplied to the solenoid coil section S, the third spring force Fk3, and the pressure induced forces acting on the individual valve bodies.

A second joint portion 25B connected with the first valve body 20 is fitted to a guide hole 2A1 in a slidable manner and is connected with the second valve body 21. This second joint portion 25B is a part of the action rod 25.

Valve body face of the second valve body 21 is symmetrically arranged with respect to that of the first valve body 20. The second valve body 21 has the same form as the first valve body 20 though the second valve body 21 takes a valve action with the second valve seat 11 in an opposite manner relative to the first valve body face 20A. This second valve body face 21A is tapered relative to the second valve seat 11. Surface area of a circle formed by the contact of the second valve body face 21A and the second valve seat 11 represents a first pressure receiving area which is denoted by S2.

A first joint portion 25A connected with the second valve body 21 is made smaller in diameter than the valve seat hole 8A, which allows the second valve chamber 4 and the second communicating passage 8 to communicate with each other.

The valve seat hole 8A and the second communicating passage 8 are so constructed that the control fluid in the crank chamber is made to flow out towards the side of suction pressure Ps when the second valve body 21 is in its opening position. Action of the second valve body 21 is determined by the sum of the attracting force exerted by the solenoid coil section S, a resilient force given by the third spring 30, and the pressure induced forces acting on the first valve body 20 and the second valve body 21. A second spring may be disposed so that the second valve body 21 is pressed against the second valve seat 11, which is not shown in the figure.

Within the solenoid coil section S, the plunger 42 is disposed in a movable manner relative to a plunger case 44 which is integrated with a solenoid casing 43. And a fixture portion 25C of the action rod 25 extending through the axis of the capacity control valve 1 is matingly fixed with a mating bore 42A of the plunger 42.

Furthermore, a fixed iron core 41 is matingly fixed with the mating surface 2B3 of the valve housing 2. And the action rod 25 mates with the inner diameter surface 41C of the fixed iron core 41 in a freely slidable manner.

A spring seating chamber is located in the plunger 42 side of the fixed iron core 41. A first spring means 48 (also known as a first resiliently impinging means) is disposed between the plunger 42 and the fixed iron core 41. The first spring biasing means 48 elastically urges the plunger 42 away from the fixed iron core 51. In this capacity control valve 1, although the first spring biasing means 48 is sufficient to drive the first valve body 20 and the second valve body 21, adding the third spring 30 improves their response. It is also known that an addition of a second spring to the second valve body even further improves their response, whose construction is omitted here.

An attractive surface 41A of the fixed iron core 41 and a contact surface 42B of the plunger 42 retain mutually opposing tapered surfaces which can be attached to or detached from each other. Attracting force between the attractive surface 41A of the fixed iron core 41 and the contact surface 42B of the plunger 42 is determined by the electric current supplied to a solenoid coil 45. Mating surface 43A of a solenoid casing 43 is securely fixed to a connection surface 2B1 located at an end shoulder of the second valve housing 2B, and the solenoid coil is installed inside an open chamber surface 43C. The solenoid coil section S represents a whole piece and the solenoid coil 45 disposed in the solenoid coil section S is controlled via a connection wire 46 by a controller (computer) which is not shown in the figure.

A plunger casing 44 is securely fitted over the fixed iron core 41 and is retained slidable relative to the plunger 42. The plunger casing 44 is securely fitted at its one end into a mating fixture surface 43B of the solenoid casing 43, and the other end is securely fixed to a mating bore of an end cover which is integral of the solenoid casing 43. This concludes the description for the constitution of the solenoid coil section 40.

Figure 7:
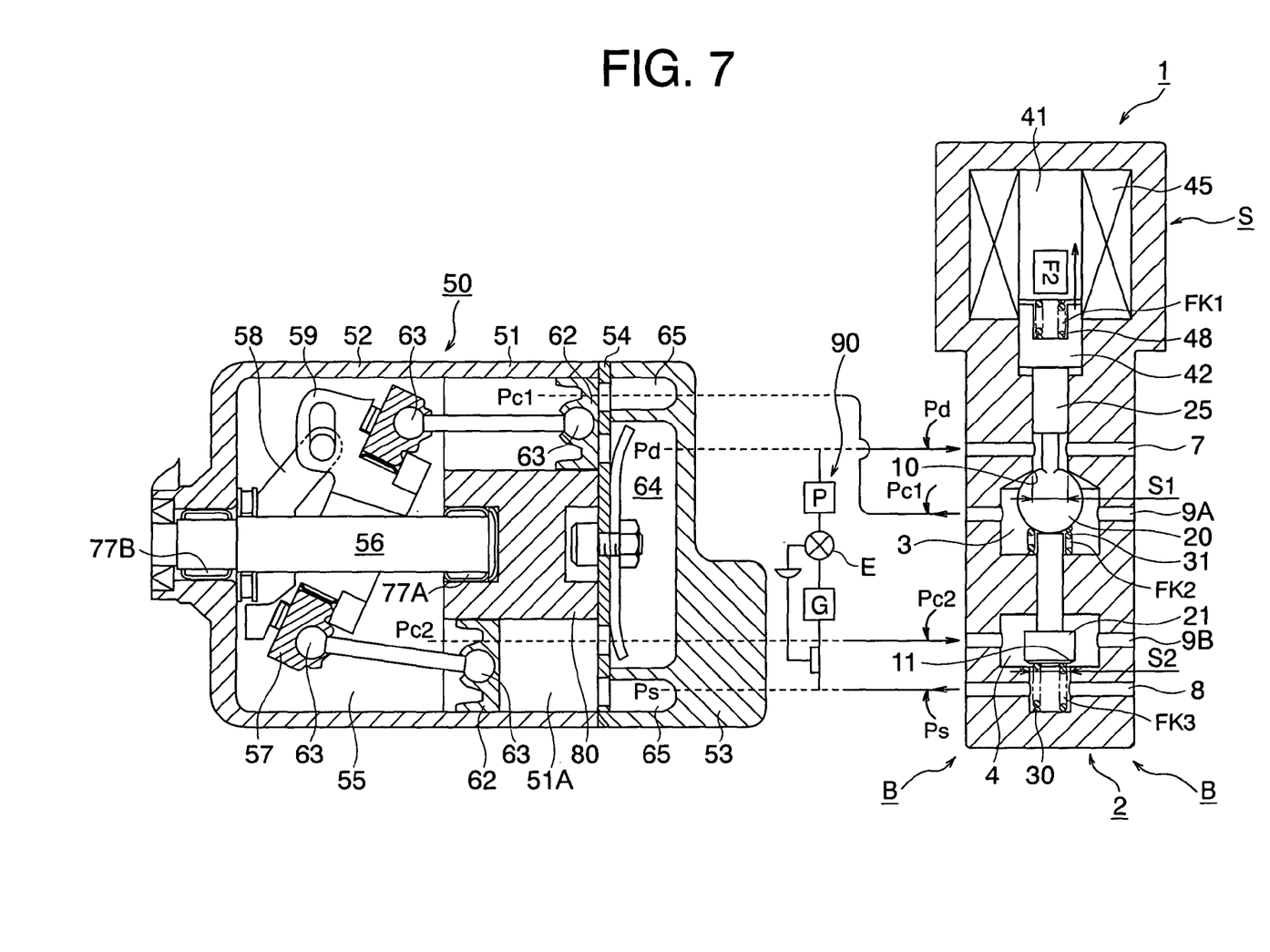
FIG. 7 is a cross sectional view of a capacity control valve attached to a variable displacement compressor as a fourth embodiment relative to the present invention.

In a capacity control valve thus constructed, forces acting on the mechanism include the forces due to discharge pressure Pd, suction pressure Ps and control chamber pressure Pc acting on the pressure receiving areas S1, S2 of the individual valve bodies 20, 21, respectively, driving force of the plunger 42, forces exerted by the first spring means 48 and the third spring means 30 and so on. These forces are in balance according to the following equation.

$$F2=(Pd-Pc1)S1+(Pc2-Ps)S2+Fk1+Fk2+Fk3,$$

where F2 is a force generated by the solenoid coil, S1 the first pressure receiving area, S2 the second pressure receiving area, Fk1 an urging force of the first spring means, (Fk2 is an urging force of the second spring means for a capacity control valve 1 in FIG. 7), Fk3 an urging force of the third spring means, Pd discharge pressure, Pc control chamber pressure (crank chamber pressure), Pc1 control chamber inlet pressure, Pc2 control chamber outlet pressure, and Ps suction pressure.

Factors affecting the pressure load of a variable displacement compressor are discharge pressure Pd, control chamber pressure Pc and suction pressure Ps. Pressure load of a variable displacement compressor is divided into two parts; pressure load generated before compression when a compressant is sucked in by a variable displacement compressor and pressure load generated during compression after the compressant is suck into a compression chamber.

The pressure load generated when a compressant is sucked in is dependent on a pressure differential (Pc−Ps) between control chamber (crank chamber) pressure Pc and suction pressure Ps while the pressure load generated during compression is related to a pressure differential (Pd−Pc) between discharge pressure Pd and control chamber pressure Pc. Therefore, the pressure load F1 is given by F1=(Pd−Pc)A+(Pc−Ps)B which is an approximation.

In this formula, A and B are constants dependent on design specifications and construction of the mechanism of a variable displacement compressor and its refrigerating system. These constants may be chosen to approximately equal to S1 and S2, respectively.

Thus a pressure load of a variable displacement compressor can be calculated from the pressure differential of control chamber pressure Pc and suction pressure Ps and the pressure differential of discharge pressure Pd and control chamber pressure Pc. That is, a stable capacity control can be achieved by keeping F1 constant by means of the capacity control valve 1.

Figure 2:
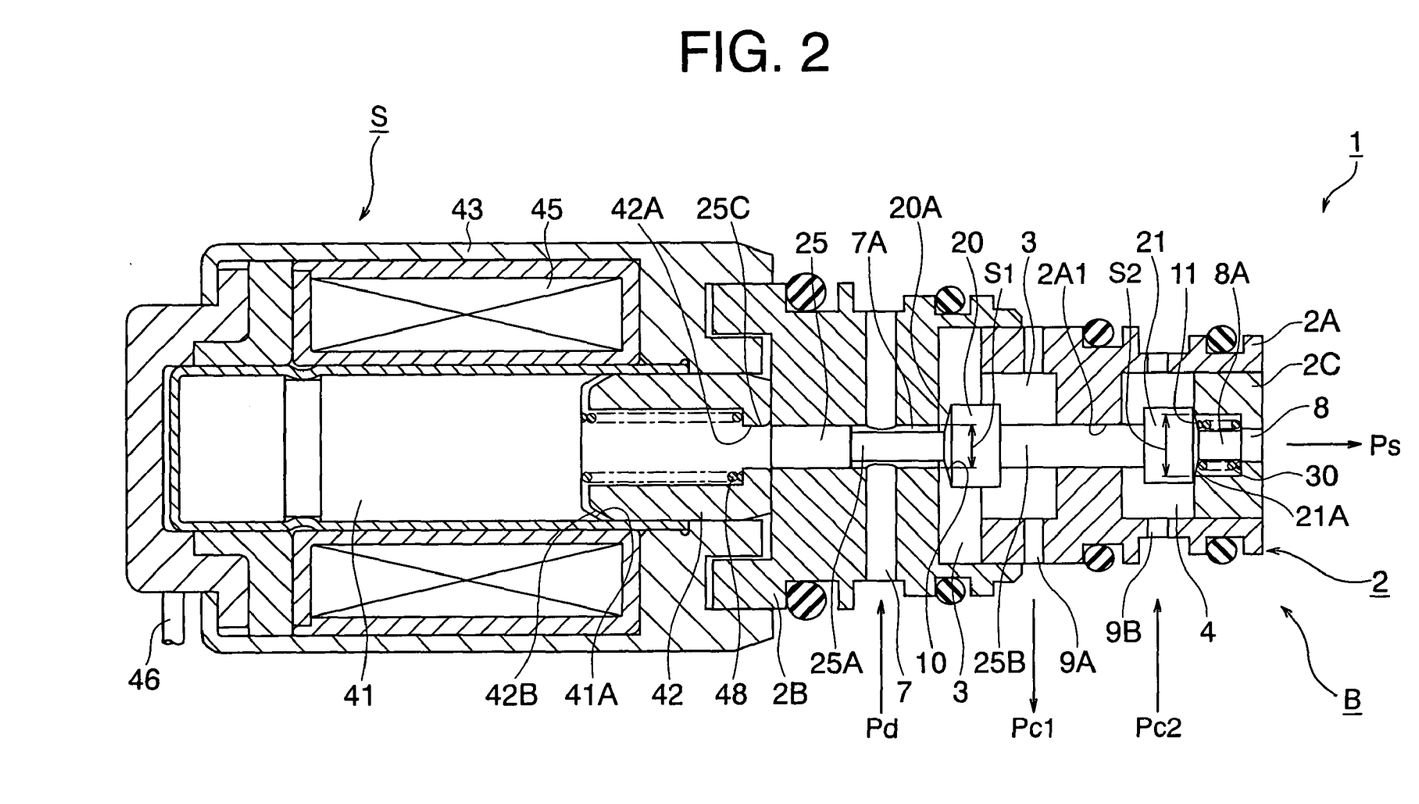
FIG. 2 is a cross sectional view of a capacity control valve as a second embodiment relative to the present invention.

FIG. 2 is a cross sectional view of a capacity control valve as a second embodiment relative to the present invention.

What makes FIG. 2 different from FIG. 1 is that a plunger 42 is disposed in the side of valve portion B.

The plunger 42 of FIG. 2 takes an action in an opposite direction to the plunger 42 of FIG. 1. Therefore, it is possible to dispose the first communicating passage 7 (communicating passage for discharge pressure Pd) and the third communicating passage 9A (communicating passage for inlet control chamber pressure Pc1) in the side of solenoid coil section S. Also the second communicating passage 8 (communicating passage for suction pressure Ps) and the fourth communicating passage 9B (communicating passage for outlet control chamber pressure Pc2) can be disposed towards the end side.

Changing the construction of the communicating passages in the capacity control valve 1 as shown in FIG. 1 and FIG. 2, it is possible to install the capacity control valve 1 to a variable displacement compressor without modifying the design of the variable displacement compressor.

Figure 3:
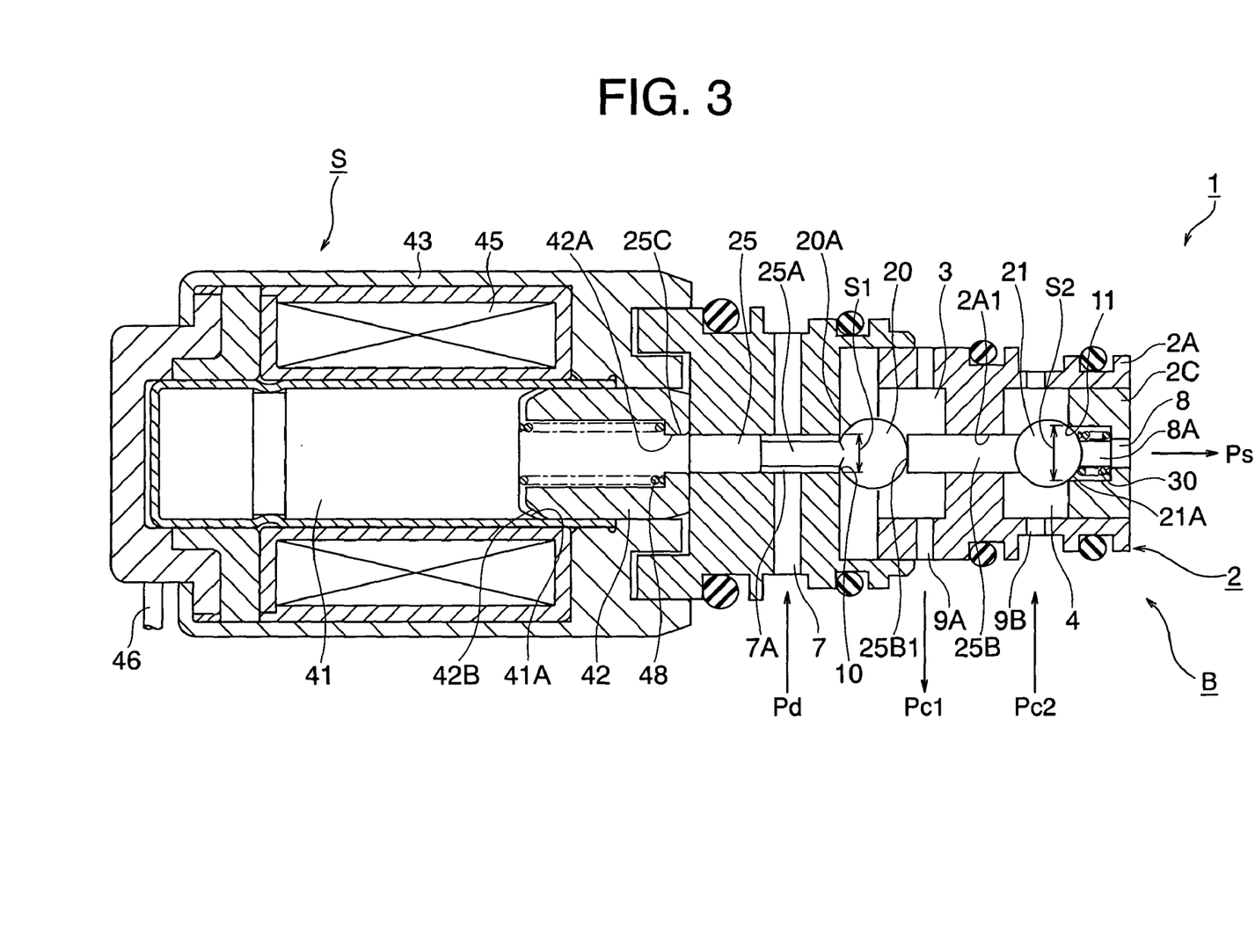
FIG. 3 is a cross sectional view of a capacity control valve as a third embodiment relative to the present invention.

FIG. 3 is a cross sectional view of a capacity control valve as a third embodiment relative to the present invention.

FIG. 3 has nearly the same construction as FIG. 2. A difference is in that the form of the first valve body 20 and the second valve body 21 is changed from a cylindrical shape to a spherical shape. With the spherical form, when the first valve body 20 and the second valve body 21 are in their closed position, they provide a better sealing contact relative to the first valve seat 10 and the second valve seat 11, respectively. In addition, upon contact of the first valve body 20 and the second valve body 21 with the first valve seat 10 and the second valve seat 11, respectively, no radial force which may induce eccentricity of the action rod 25 is exerted. This can reduce a sliding friction of the outer diameter surface of the action rod 25 when the rod is subjected to a sliding motion relative to the valve housing 2

Figure 4:
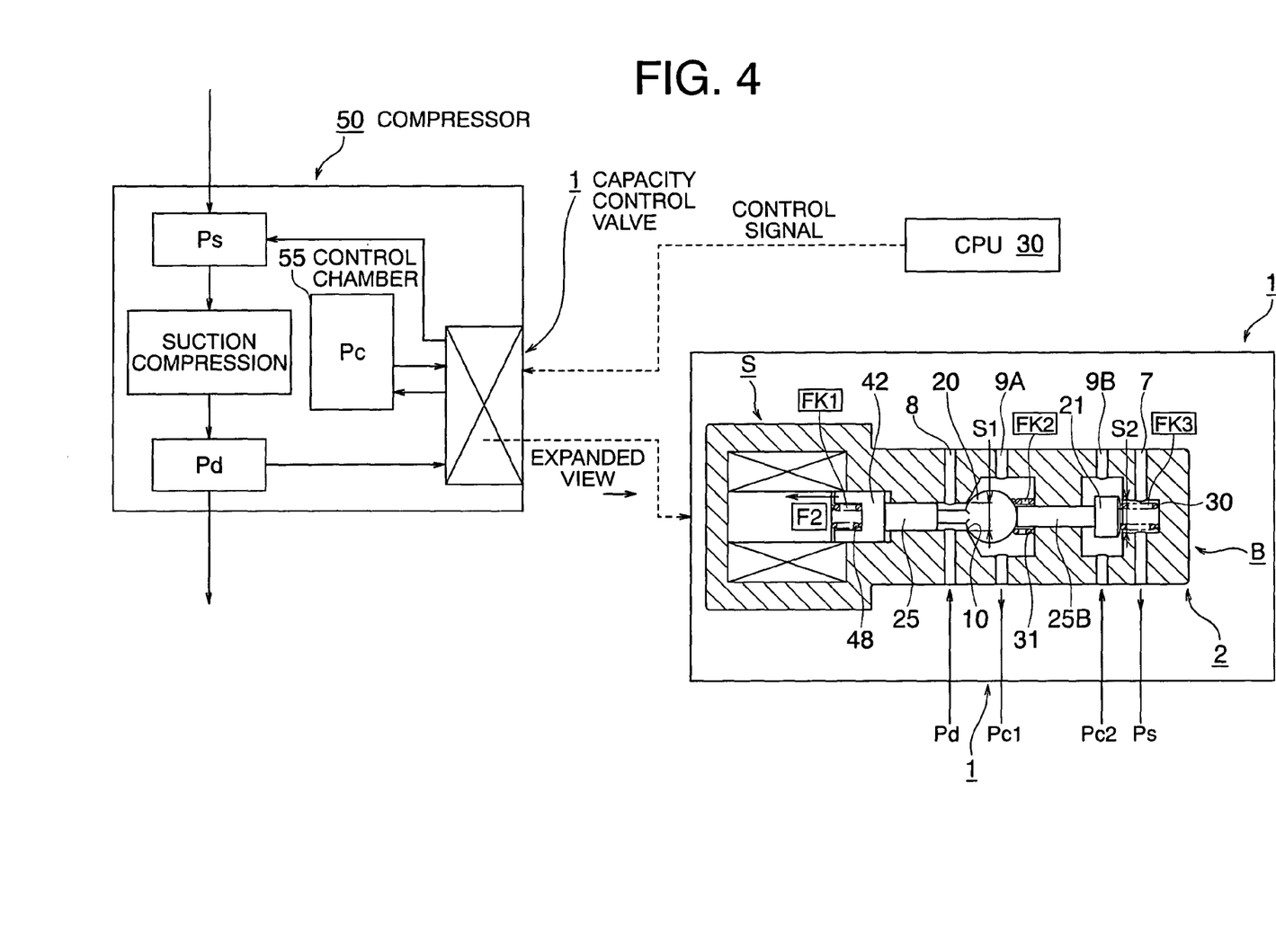
FIG. 4 is a diagram of a control method of a capacity control valve representing the first embodiment relative to the present invention.

FIG. 4 illustrates a diagram of a control method of a capacity control valve 1 representing the first embodiment relative to the present invention.

FIG. 4 indicates a close-up view of a capacity control valve 1 to the right side of the figure which is installed in a variable displacement compressor 50. This capacity control valve 1 is almost the same as the valve 1 in FIG. 2. What makes it different from FIG. 2 is that the first valve body 20 has a spherical shape. Also the first valve body 20 is resiliently urged by the second spring means 31 whose spring constant is Fk2. Additionally, the second communicating passage 8 constitutes a through hole radially extending through the valve housing 2.

Pressure load of this capacity control valve 1 is represented by F2=(Pd−Pc1)S1+(Pc2−Ps)S2+Fk1−Fk2−Fk3.

Solenoid coil section S of the capacity control valve 1 is controlled by a controller (CPU) 30 such that F2 is kept constant according to a specified input value. The solenoid coil section S modulates the openings of the first valve body 20 and the second valve body 21 by acting on the valve bodies 20 and 21 according to an electric current supplied to the solenoid S.

Opening the first valve body 20 allows the discharge pressure Pd to flow into a crank chamber (also known as a control chamber) of a variable displacement compressor. At the same time, the pressure within the crank chamber is controlled so as to be kept constant by throttling the control chamber pressure Pc flowing out of the crank chamber (Pc1−Pc2) by means of the second valve body 21.

Figure 5:
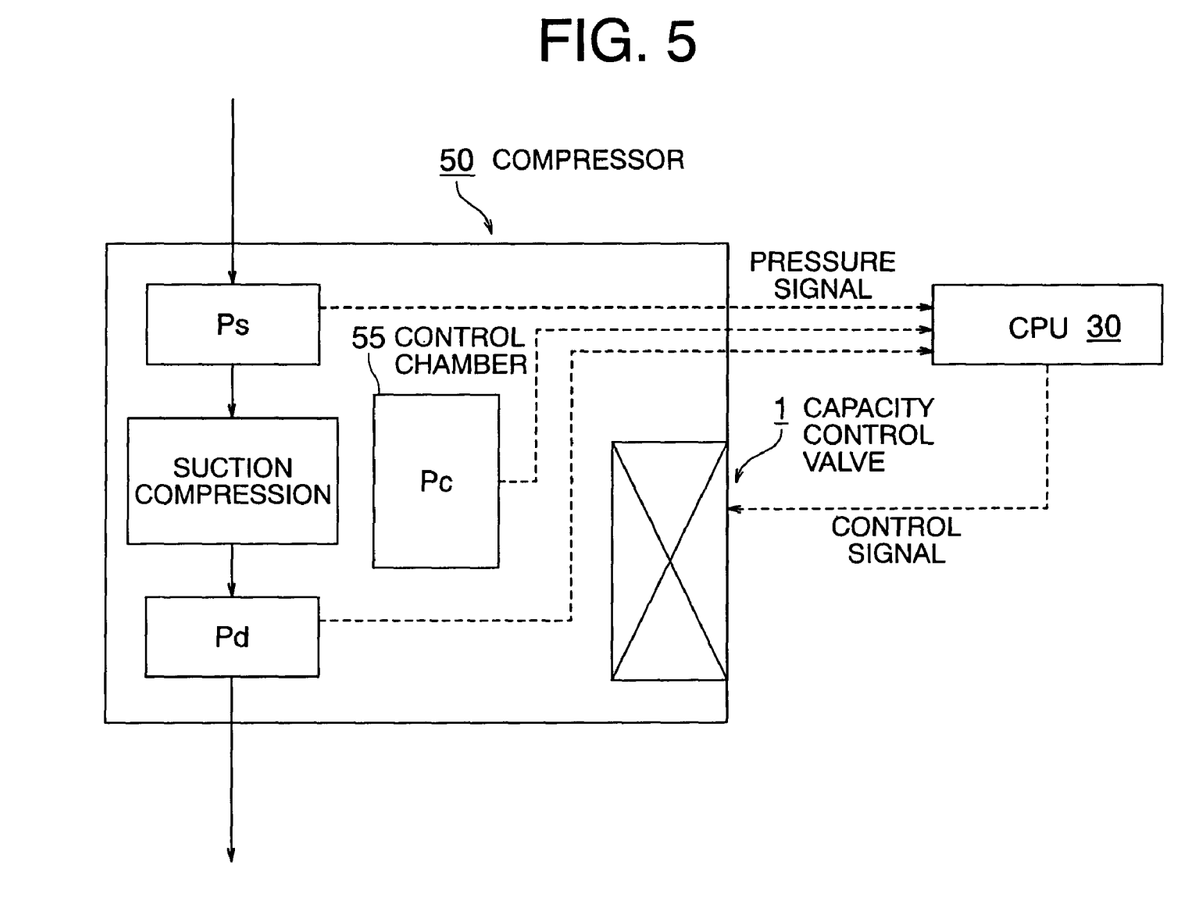
FIG. 5 is a diagram of a control method of a capacity control valve representing the second embodiment relative to the present invention.

FIG. 5 illustrates a diagram of a control method of a capacity control valve 1 representing the second embodiment relative to the present invention. In FIG. 5, the controller (CPU) 60 detects suction pressure Ps, control chamber pressure Pc of a crank chamber 55, and discharge pressure Pd, and executes numerical operations based on these pressure values. The controller 60 then controls the pressure load of the capacity control valve 1 such that the pressure load becomes $$F2=(Pd-Pc1)S1+(Pc2-Ps)S2+Fk1-Fk2-Fk3.$$

Other construction is more or less the same as that of the first embodiment.

Figure 6:
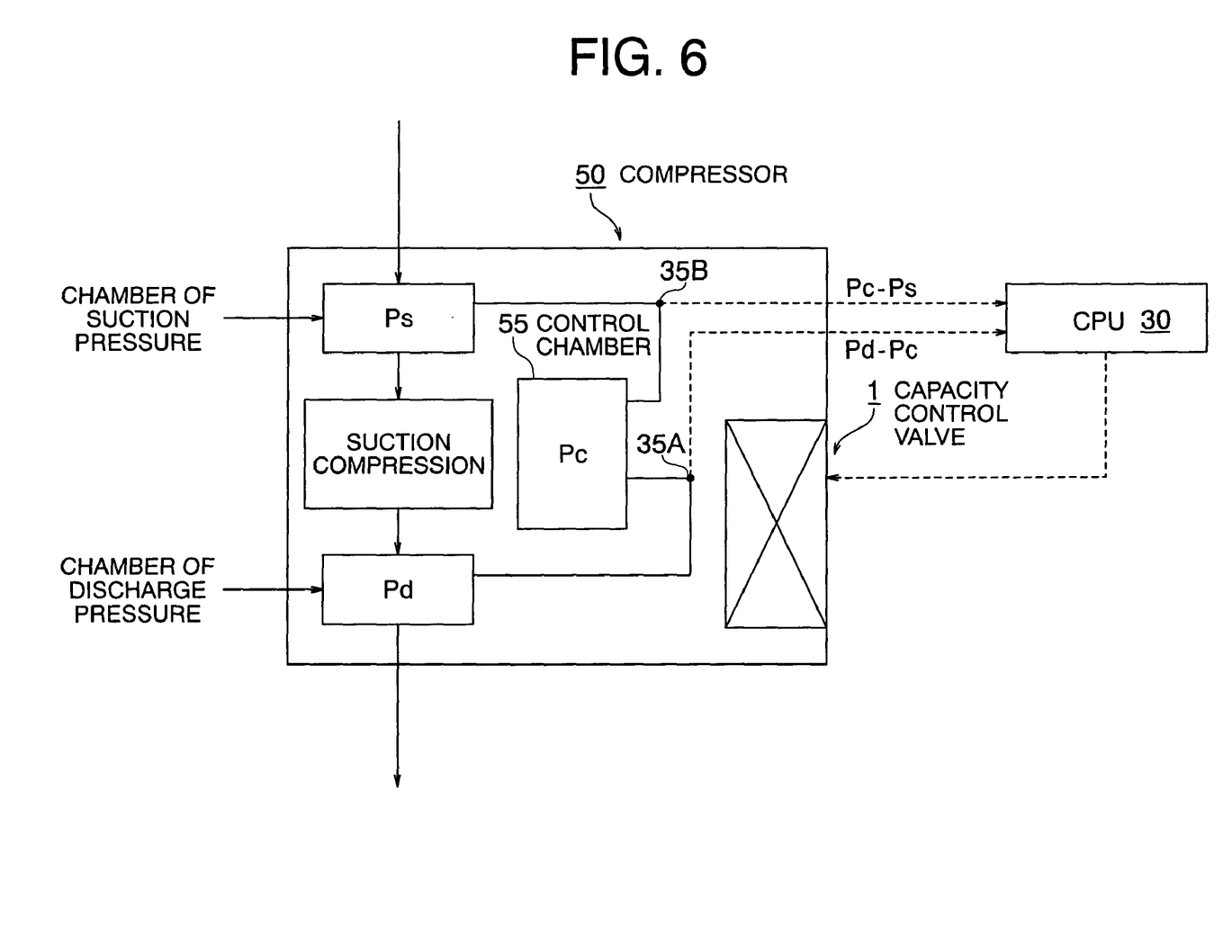
FIG. 6 is a diagram of a control method of a capacity control valve representing the third embodiment relative to the present invention.

FIG. 6 illustrates a diagram of a control method of a capacity control valve 1 representing the third embodiment relative to the present invention.

The capacity control valve 1 of FIG. 6 is almost the same as the valve 1 in FIG. 5. A difference is that there are pressure sensors 35A, 35B disposed in a communicating passage between suction pressure Ps and control chamber pressure Pc within the control chamber and a communicating passage between discharge pressure Pd and control chamber pressure Pc, respectively. Pressure measurements obtained by the pressure sensors 35A, 35B are inputted to a controller 60. These pressure measurements are sent to the controller (CPU) 60 for computations and the pressure load of the capacity control valve 1 is controlled such that the following equation is maintained;

$$F2=(Pd-Pc1)S1+(Pc2-Ps)S2+Fk1-Fk2-Fk3.$$

Also under the pressure load of F1=A(Pd−Pc)+B(Pc−Ps), similar performance will be obtained for the second embodiment as well as the third embodiment.

Next, the capacity control valve 1 of the present invention can be used for pneumatic machines such as air pumps, air compressors or the like. Described below is an embodiment of a fourth invention where the capacity control valve 1 is used in a variable displacement compressor.

FIG. 7 is a cross sectional view representing a relationship between a variable displacement compressor and a capacity control valve 1. In FIG. 7 the capacity control valve 1 is more or less the same as that of FIG. 4. Therefore, the capacity control valve 1 will be explained only briefly.

In FIG. 7, an outer casing of the variable displacement compressor 50 consists of a cylinder block 51 containing a plurality of cylinder bores 51A, a front housing 52.

Variable displacement compressor 50 in FIG. 7 retains a housing which comprises a cylinder block 51 disposing a plurality of cylinder bore 51A therein, a front housing 52 being located adjacent one end of the cylinder block 51, and a rear housing 53 being connected via a valve plate 54 to the rear housing 53.

This housing retains a crank chamber 55 (also called control chamber) defined between the cylinder block 51 and the front housing 52. The crank chamber 55 disposes a longitudinally extending shaft 56 therein. A swash plate 57 is connected via a joint portion 59 with a rotor 58 which is securely fixed to the shaft 56 so that the inclined angle of the swash plate 57 can be changed.

One end of the shaft 56 extends to an external through a boss 52A which protrudes to the outside of the front housing 52, which is not shown in the figure. Bearing disposed inside the boss supports the shaft 56.

A seal portion is disposed between the shaft 56 and the boss, which securely seals the internal from the external. The other end of the shaft 56 is located within the cylinder block 51 and a support block 80 supports the end. Thrust bearings 77A, 77B disposed at the both ends of the shaft 56 supports the shaft 56 in a freely rotatable manner.

Piston 62 is disposed within the cylinder bore 51A. The piston 62 and the swash plate 57 are connected with each other via a connecting rod which has balls 63 on its both ends. Also the swash plate 57 and a joint portion 59 are connected via a thrust bearing in a mutually rotatable manner. The piston 62 and the swash plate 57 are so constructed that they move together. Pressure differential between discharge pressure Pd and crank chamber pressure of a crank chamber 55 acts on the connecting rods so as to modulate the inclined angle of the swash plate 57.

Within the rear housing 53, suction chamber 65 and discharge chamber 64 are separately located. Suction chamber 65 and the cylinder bore 51A communicate with each other via a suction valve which is disposed in the valve plate 54. Discharge chamber 64 and the cylinder bore 51A communicate with each other via a discharge valve which also is located in the valve plate 54.

A protrusion located in the right side of the rear housing 53 contains a cavity which is not shown in the figure, and a capacity control valve 1 is disposed in the cavity. The capacity control valve 1 in FIG. 7 is more or less the same as that in FIG. 4 and is shown separately in an enlarged scale for clarity reason. Part symbols used are the same as FIG. 4, therefore their description is omitted.

A refrigerant circulating circuit 90 for an automotive air conditioning system undertakes a refrigerating cycle by means of the capacity control valve 1 controlling the crank chamber pressure of the crank chamber 1. The refrigerant circulation circuit 90 mainly consists of condenser P, evaporator G and expansion valve E.

In the arrangement of a variable displacement compressor 50 and a capacity control valve 1 disposed therewith, since the swash plate 57 rotates with the rotor 58, the piston 62 makes a reciprocal motion as the inclined angle of the swash plate 57 varies. Gaseous refrigerant discharged from the discharge chamber 64 in accordance with the reciprocal motion of the piston 63 is provided with from the condenser P via the expansion valve into the evaporator G, and is fed back to the suction chamber 65 after undertaking a specified refrigerating operation.

A capacity control valve 1 disposed in the variable displacement compressor 50 which undertakes the above mentioned operation cycle is able to control the pressure within the crank chamber 55, to keep a pressure load constant at a specified level even under an increasing rotary speed of the variable displacement compressor 50, and to provide a more stable control by preventing a response delay of discharge pressure.

For this purpose, the first communicating passage 7 of the capacity control valve 1 communicates with the discharge chamber 64 of the variable displacement compressor 50. So does the suction chamber 7 with the second communicating passage 8. Also the third communicating passage 9A and the fourth communicating passage 9B communicate with the crank chamber 55.

And the first communicating passage 7 and the second communicating passage 8 are used for an incoming fluid of discharge pressure Pd and an outgoing fluid of suction pressure Ps to flow through. At the same time, a fluid of control chamber pressure Pc is supplied from the third communicating passage 9A to the crank chamber 55 by the opening action of the first valve body 20, which regulates the pressure of the crank chamber 55. Next, a fluid of control chamber pressure Pc flown out of the crank chamber 55 is controlled by the opening action of the second valve body 21. The opening actions of the first valve body 20 and the second valve body 21 take place in mutually opposite directions. And the control chamber pressure Pc can be stably controlled by using a pressure load defined by either F1 or F2.

In control method of a capacity control valve 1 as another embodiment related to the third invention, a first pressure differential Pd−Pc1 is detected by a first pressure sensor 35A which is disposed in a communicating passage between a chamber of discharge pressure Pd and a control chamber (crank chamber) 55, a second pressure differential Pc2−Ps detected by a second pressure sensor 35B which is disposed in a communicating passage between a chamber of discharge pressure Pd and a control chamber 55, and these pressure measurements are inputted to the controller 60 for computing a pressure load F1.

In the control method of a capacity control valve 1 related to the third invention, a first pressure differential Pd−Pc1 is detected by a first pressure sensor 35A which is disposed in a communicating passage between the chamber of discharge pressure Pd and the control chamber 55 while a second pressure differential Pc2−Ps is detected by a second pressure sensor 35B which is disposed in a communicating passage between the control chamber 55 and the suction pressure chamber Ps. As the result, the controller 60 is cost-effective and more accurate computation of the pressure load F1 can be achieved.

Advantages of the present invention will be briefly described next.

According to the present invention of capacity control valve 1 and its control method, a pressure differential between the control chamber pressure Pc and the suction pressure Ps as well as a pressure differential between the discharge pressure Pd and the control chamber pressure Pc are multiplied by characteristic coefficients which depend on what kind of pneumatic machine (variable displacement compressor, for instance) is used. For example, a pressure load used in control can be obtained by multiplying the pressure receiving areas S1, S2 of the valve bodies 20, 21 by the corresponding pressure differentials as well as the coefficients and taking their sum. This control method induces a pressure difference on the control chamber pressure Pc between the inlet and the outlet of the control chamber 60, which leads to a quick shift of the inclination angle of a swash plate triggered by a change in the control chamber pressure Pc. That is, a change of discharge pressure Pd in accordance with a total compression capacity change by the swash plate of a compressor can be realized in a short period of time.

Fluctuations of the pressure load due to the operation under an abrupt increase of a compressor speed can be regulated by a suitable control in accordance with the pressure load change.

In addition, a first pressure differential is detected by a first pressure sensor 35A which is disposed in a communicating passage between the discharge pressure Pd chamber and the control chamber 55. Also a second pressure differential is measured by a second pressure sensor 35B which is disposed in a communicating passage between the control chamber 55 and the suction pressure Ps chamber. This enables the controller 60 to compute a pressure load based on the pressure measurements obtained by the individual pressure sensors 35A, 35B, which not only prevents a control delay but also achieves a stable control. Furthermore, the controller 60 can be fabricated at low cost.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A capacity control valve for modulating the capacity or the pressure of a control chamber by controlling the degree of opening of a valve section with a solenoid coil section via a pressure fluid of said control chamber flowing through an opened passage of said valve section, said control valve comprising:

a first valve chamber disposed in said valve section and communicating with a first communicating passage for a discharge pressure;

a first valve seat located in a first passage defined between said first valve chamber and said first communicating passage;

a third communicating passage for a first control chamber pressure communicating with said control chamber and said first valve chamber;

a second valve chamber communicating with a fourth communicating passage for a second control chamber pressure which communicates with said control chamber;

a second communicating passage for a suction pressure communicating with a chamber of said suction pressure and said second valve chamber;

a second valve seat located in a second passage defined between said second valve chamber and said second communicating passage;

a first valve body disposed within said first valve chamber and having a second valve face which opens or closes against said first valve seat;

a second valve body disposed within said second valve chamber and having a second valve face which opens or closes against said second valve seat;

a connection rod seating one of said first valve body and said second valve body against the corresponding valve seat while lifting the other valve body away from the corresponding valve seat; and a solenoid coil section driving said first valve body and said second valve body in an opening or a closing direction via a solenoid rod;

wherein said solenoid coil section controls a pressure load according to a specified input given to a controller in which said input is defined as a sum of a pressure differential (Pd–Pc1) between said discharge pressure and said first control chamber pressure, multiplied by a pressure receiving area of said first valve body receiving said pressure differential between said discharge pressure and said first control chamber pressure, and a pressure differential (Pc2–Ps) between a pressure in said second control chamber pressure and said suction pressure, multiplied by a pressure receiving area of said second valve body receiving said pressure differential between said second control chamber pressure and said suction pressure, and wherein said input corresponds to an electric current transmitted to said solenoid coil section via a connection wire connecting said controller and said solenoid coil section.

2. A capacity control method of a capacity control valve for controlling the pressure or the capacity of a control chamber by making a fluid of discharge pressure flow from a chamber of said discharge pressure into said control chamber by means of the control of said capacity control valve while letting a fluid of control pressure flow out of said control chamber to a chamber of suction pressure by means of the control of said capacity control valve, wherein a first valve body and a second valve body of said capacity control valve are opened or closed in accordance with a specified input given to a controller in which said input is defined as a sum of a first pressure differential (Pd–Pc1) between said discharge pressure and said first control chamber pressure, multiplied by a pressure receiving area of said first valve body receiving, in the direction of opening of said first valve body, said pressure differential between said discharge pressure and said first control chamber pressure, and a second pressure differential (Pc2–Ps) between a second control chamber pressure and said suction pressure, multiplied by a pressure receiving area of said second valve body receiving, in the direction of opening of said second valve body, a said pressure differential between said second control chamber pressure and said suction pressure, wherein said input corresponds to an electric current transmitted to a solenoid coil section via a connection wire connecting said controller and said solenoid coil section, wherein said solenoid coil section opens and closes said first and second valve bodies.

3. A capacity control method of a capacity control valve according to claim 2, wherein said first pressure differential (Pd–Pc1) is detected by a first pressure sensor disposed in a communicating passage between said discharge pressure chamber and said control chamber, said second pressure differential (Pc2–Ps) is detected by a second pressure sensor disposed in a communicating passage between said control chamber and said suction pressure chamber, and the detected pressure measurements are inputted to a controller to calculate the pressure load.

* * * * *